(No Model.)
E. D. NEWTON.
MULTI CHAMBERED BOTTLE.
No. 299,253. Patented May 27, 1884.
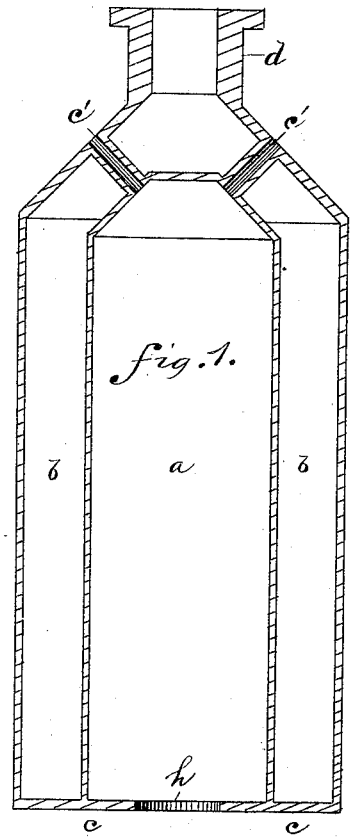
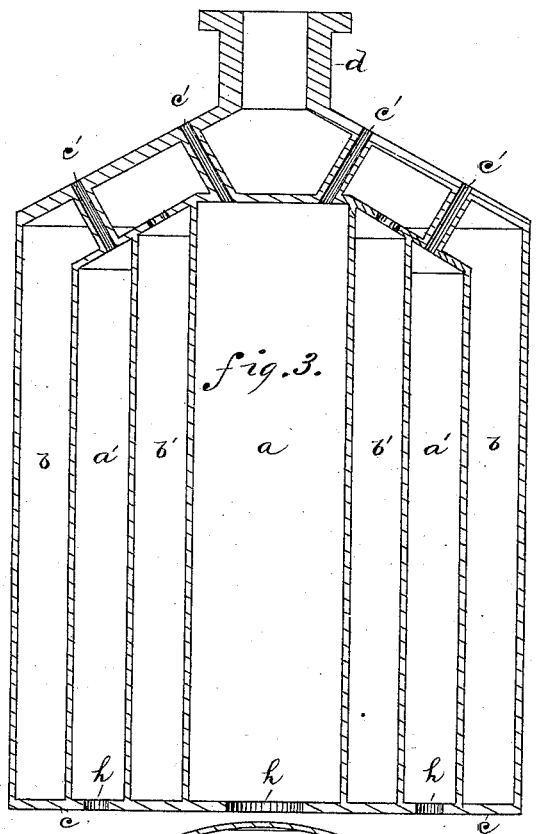
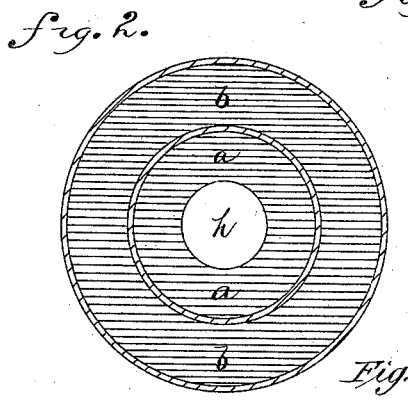
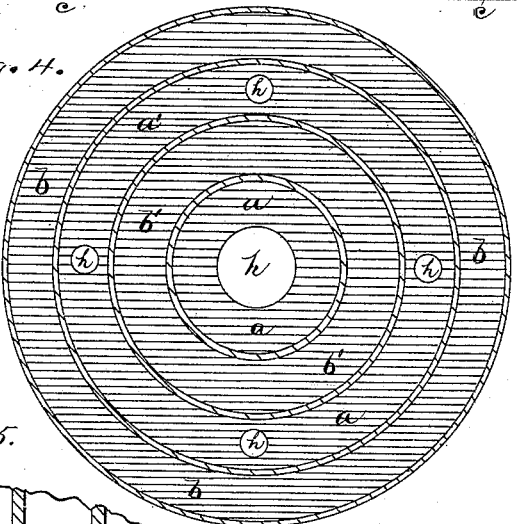
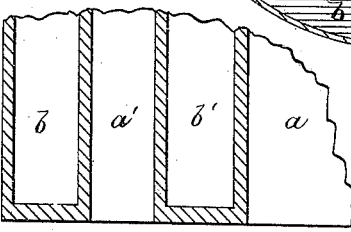
WITNESSES:
H. B. Brown
John C. Kenion
INVENTOR:
E. D. Newton
BY Munn & Co.
ATTORNEYS.

UNITED STATES PATENT OFFICE.

EDWIN D. NEWTON, OF NEW YORK, N. Y.

MULTICHAMBERED BOTTLE.

SPECIFICATION forming part of Letters Patent No. 299,253, dated May 27, 1884.

Application filed December 20, 1883. (No model.)

*To all whom it may concern:*

Be it known that I, EDWIN D. NEWTON, a citizen of the United States, residing at New York city, in the State of New York, have invented certain new and useful Improvements in Multichambered Bottles, of which the following is a description.

Figure 1 is a central vertical section of my improved bottle. Fig. 2 is a horizontal section of the same. Figs. 3 and 4 are similar sections of a multichambered bottle constructed on the same principle, and Fig. 5 is a detail sectional elevation of a modification.

My invention relates to multichambered bottles or flasks for heating non-sedimentary mineral waters and carbonated and spirituous liquors rapidly and uniformly by absorption; and it consists of a multichambered bottle provided with one or more thermic chambers, each having an orifice at its lower end for the introduction of hot water or other suitable heating-fluid, and each having passages at its upper end for the escape of air, the thermic chambers being surrounded by fluid-chambers having little width and as large surfaces as possible, so that the fluid in said fluid-chambers will be uniformly and rapidly heated by the hot water.

My invention further consists in connecting the lower ends of the thermic chambers by a bottom or plates provided with an orifice or orifices for the passage of hot water to the thermic chamber or chambers, whereby the bottle will be strengthened or re-enforced at its lower end, as hereinafter more fully set forth.

In Figs. 1 and 2 I have shown a multichambered bottle consisting, preferably, of a long bottle provided with a central circular thermic chamber, $a$, surrounded by an annular fluid-chamber, $b$, having little width and large side surfaces. The chambers $b\ b'$ may be each provided with an annular bottom, and the chambers $a\ a'$ may be bottomless, as shown in the modified form of multichambered bottle represented in Fig. 5; but this construction weakens the multichambered bottle materially; and I prefer to employ a bottom or plate, $c$, as the common bottom of the thermic chambers $a\ a$ and the receptacles $b\ b'$, said bottom being made in one piece and provided with apertures $h$, for the passage of hot water to the thermic chambers, as shown in the drawings. $c'\ c'$ represent passages for the escape of air at the upper end of the thermic chamber when the bottle is inserted with its lower end downward into a vessel containing hot water. $d$ represents the neck of the bottle, from which the hot mineral water in the fluid-chambers can be poured when desired.

In Figs. 3 and 4 the same principle of construction is involved; but instead of one thermic chamber $a$, two, $a$ and $a'$, are employed, each provided with passages $c'\ c'$, for the escape of air when immersed in the hot water contained in a vessel, and each thermic chamber provided with a re-enforcing plate, $c$, having an orifice, $h$. $b$ and $b'$ represent the fluid-chambers surrounding each thermic chamber, and $d$ is the neck of the multichambered bottle.

I am aware that a can for cooling milk provided with a central tube open at both ends and extending from the bottom of said can up through its neck is old, and I therefore lay no claim to such invention. In such structure the milk is liable to be poured into the open end of the cooling-chamber in filling the can.

Having thus fully described my invention, what I claim as new, and desire to secure by Letters Patent, is—

1. A multichambered bottle provided with thermic chambers open at their lower ends and closed at their upper ends, and having air-vent tubes extending from the thermic chambers through the exterior walls of the bottle, whereby the filling-opening of the bottle is unobstructed and the liability of the ingress of the liquid to be warmed into the thermic chambers is avoided, as set forth.

2. A multichambered bottle provided with thermic chambers open at their lower ends and closed at their upper ends, and having air-vent tubes extending from the thermic chambers through the exterior walls of the bottle, and provided with a bottom, $c$, formed of one piece, and having orifices $h$, each leading to a thermic chamber, as set forth.

EDWIN D. NEWTON.

Witnesses:
Y. H. WYNN,
JOHN CALVIN JOHNSON.